(12) United States Patent
Elkolaly

(10) Patent No.: US 7,854,160 B2
(45) Date of Patent: Dec. 21, 2010

(54) DIAGNOSTIC SYSTEMS AND METHODS FOR THE HIGH PRESSURE SIDE OF FUEL SYSTEMS IN COMMON FUEL RAIL ENGINES

(75) Inventor: Omar Elkolaly, West Bloomfield, MI (US)

(73) Assignee: GM Global Technology Operations, Inc.

( * ) Notice: Subject to any disclaimer, the term of this patent is extended or adjusted under 35 U.S.C. 154(b) by 81 days.

(21) Appl. No.: 12/194,074

(22) Filed: Aug. 19, 2008

(65) Prior Publication Data

US 2009/0049898 A1    Feb. 26, 2009

Related U.S. Application Data

(60) Provisional application No. 60/965,393, filed on Aug. 20, 2007.

(51) Int. Cl.
*G01M 15/04* (2006.01)

(52) U.S. Cl. .................................... 73/114.43

(58) Field of Classification Search ............... 73/114.43
See application file for complete search history.

(56) References Cited

U.S. PATENT DOCUMENTS

| | | | | |
|---|---|---|---|---|
| 5,467,641 | A * | 11/1995 | Williams et al. | 73/49.7 |
| 5,675,073 | A * | 10/1997 | Otsuka | 73/40.5 R |
| 6,966,215 | B2 * | 11/2005 | Amano et al. | 73/49.2 |
| 7,171,952 | B2 * | 2/2007 | Joos et al. | 123/457 |
| 7,523,743 | B1 * | 4/2009 | Geveci et al. | 123/486 |
| 7,558,665 | B1 * | 7/2009 | Geveci et al. | 701/104 |
| 2004/0237937 | A1 * | 12/2004 | Joos et al. | 123/457 |
| 2005/0044942 | A1 * | 3/2005 | Amano et al. | 73/118.1 |
| 2006/0191330 | A1 * | 8/2006 | Hayakawa et al. | 73/118.1 |

* cited by examiner

*Primary Examiner*—Freddie Kirkland, III

(57) ABSTRACT

A fuel system diagnostic module comprises a pressure module and a fault diagnostic module. The pressure module determines first and second pressures of a fuel rail of a fuel system at first and second times, respectively. The second time is after shutdown of an engine. The fault diagnostic module selectively diagnoses a fault in the fuel system based upon a comparison of a predetermined period with a period between the engine shutdown and the second time.

16 Claims, 9 Drawing Sheets

DIAGNOSTIC SYSTEMS AND METHODS FOR THE HIGH PRESSURE SIDE OF FUEL SYSTEMS IN COMMON FUEL RAIL ENGINES

CROSS-REFERENCE TO RELATED APPLICATIONS

This application claims the benefit of U.S. Provisional Application No. 60/965,393, filed on Aug. 20, 2007. The disclosure of the above application is incorporated herein by reference in its entirety.

FIELD

The present disclosure relates to internal combustion engines and more particularly to diagnostic systems for the high pressure side of a fuel system in a common fuel rail engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. Air is drawn into an engine 102 through an intake manifold 104. A throttle valve 106 is actuated by an electronic throttle control (ETC) motor 108 to vary the volume of air drawn into the engine 102. The air mixes with fuel from one or more fuel injectors 110 to form an air-fuel mixture. The air-fuel mixture is combusted within one or more cylinders 112 of the engine 102. Resulting exhaust gas is expelled from the cylinders to an exhaust system 113.

Fuel is supplied to the engine 102 by a fuel system. For example only, the fuel system may include the fuel injectors 110, a fuel tank 114, a low pressure pump 115, a high pressure pump 116, and a fuel rail 118. Fuel is stored within the fuel tank 114. A low pressure pump 115 draws fuel from the fuel tank 114 and provides fuel to the high pressure pump 116. The high pressure pump 116 provides pressurized fuel to the fuel injectors 110 via the fuel rail 118. The fuel injectors 110, the high pressure pump 116, and the fuel rail 118 will be collectively referred to as the high pressure side of the fuel system.

An engine control module (ECM) 120 receives a rail pressure signal from a rail pressure sensor 122. The rail pressure signal indicates the pressure of the fuel within the fuel rail 118 (i.e., rail pressure). The ECM 120 controls the amount and the timing of the fuel injected by the fuel injectors 110. The rail pressure decreases each time fuel is injected by one or more of the fuel injectors 110. The ECM 120 maintains the rail pressure via the high pressure pump 116.

SUMMARY

A fuel system diagnostic module comprises a pressure module and a fault diagnostic module. The pressure module determines first and second pressures of a fuel rail of a fuel system at first and second times, respectively. The second time is after shutdown of an engine. The fault diagnostic module selectively diagnoses a fault in the fuel system based upon a comparison of a predetermined period with a period between the engine shutdown and the second time.

In further features, the fuel system diagnostic module further comprises a decay calculation module that determines a decay rate based upon the first rail pressure, the second rail pressure, and the period. The fault diagnostic module diagnoses the fault when the decay rate is greater than a predetermined value.

In still further features, the first time occurs at the engine shutdown. In other features, the first time occurs before the engine shutdown. The second time occurs when the second rail pressure is equal to a predetermined pressure. The fault diagnostic module diagnoses the fault when the period is less than the predetermined period. The fuel system comprises the fuel rail, a fuel injector, and a fuel pump.

A fuel system diagnostic module comprises a pressure module and a fault diagnostic module. The pressure module determines first and second pressures of a fuel rail of a fuel system at first and second times, respectively. The second time is after engine shutdown. The fault diagnostic module selectively diagnoses a fault in the fuel system based upon a comparison of the second pressure with a predetermined pressure.

In further features, the fuel system diagnostic module further comprises a decay calculation module that determines a decay rate based upon the first rail pressure, the second rail pressure, and a period between the engine shutdown and the second time. The fault diagnostic module diagnoses the fault when the decay rate is greater than a predetermined value.

In still further features, the first rail pressure is determined at the engine shutdown. In other features, the first rail pressure is determined before the engine shutdown. The second rail pressure is determined at a predetermined time after the engine shutdown. The fuel system comprises the fuel rail, a fuel injector, and a fuel pump.

A method comprises determining first and second pressures of a fuel rail of a fuel system at first and second times, respectively; comparing a predetermined period with a period between the engine shutdown and the second time; and selectively diagnosing a fault in the fuel system based upon the comparison. The second time is after shutdown of an engine.

In further features, the method further comprises determining a decay rate based upon the first rail pressure, the second rail pressure, and the period; and diagnosing the fault when the decay rate is greater than a predetermined value.

In still further features, the first time occurs at the engine shutdown. In other features, the first time occurs before the engine shutdown. The second time occurs when the second rail pressure is equal to a predetermined pressure. The method further comprises diagnosing the fault when the period is less than the predetermined period. The fuel system comprises the fuel rail, a fuel injector, and a fuel pump.

A method comprises determining first and second pressures of a fuel rail of a fuel system at first and second times, respectively; comparing the second pressure with a predetermined pressure; and selectively diagnosing a fault in the fuel system based upon the comparison. The second time is after engine shutdown.

In further features, the method further comprises determining a decay rate based upon the first rail pressure, the second rail pressure, and a period between the engine shutdown and the second time; and diagnosing the fault when the decay rate is greater than a predetermined value.

In still further features, the first rail pressure is determined at the engine shutdown. In other features, the first rail pressure is determined before the engine shutdown. The second rail pressure is determined at a predetermined time after the engine shutdown. The fuel system comprises the fuel rail, a fuel injector, and a fuel pump.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
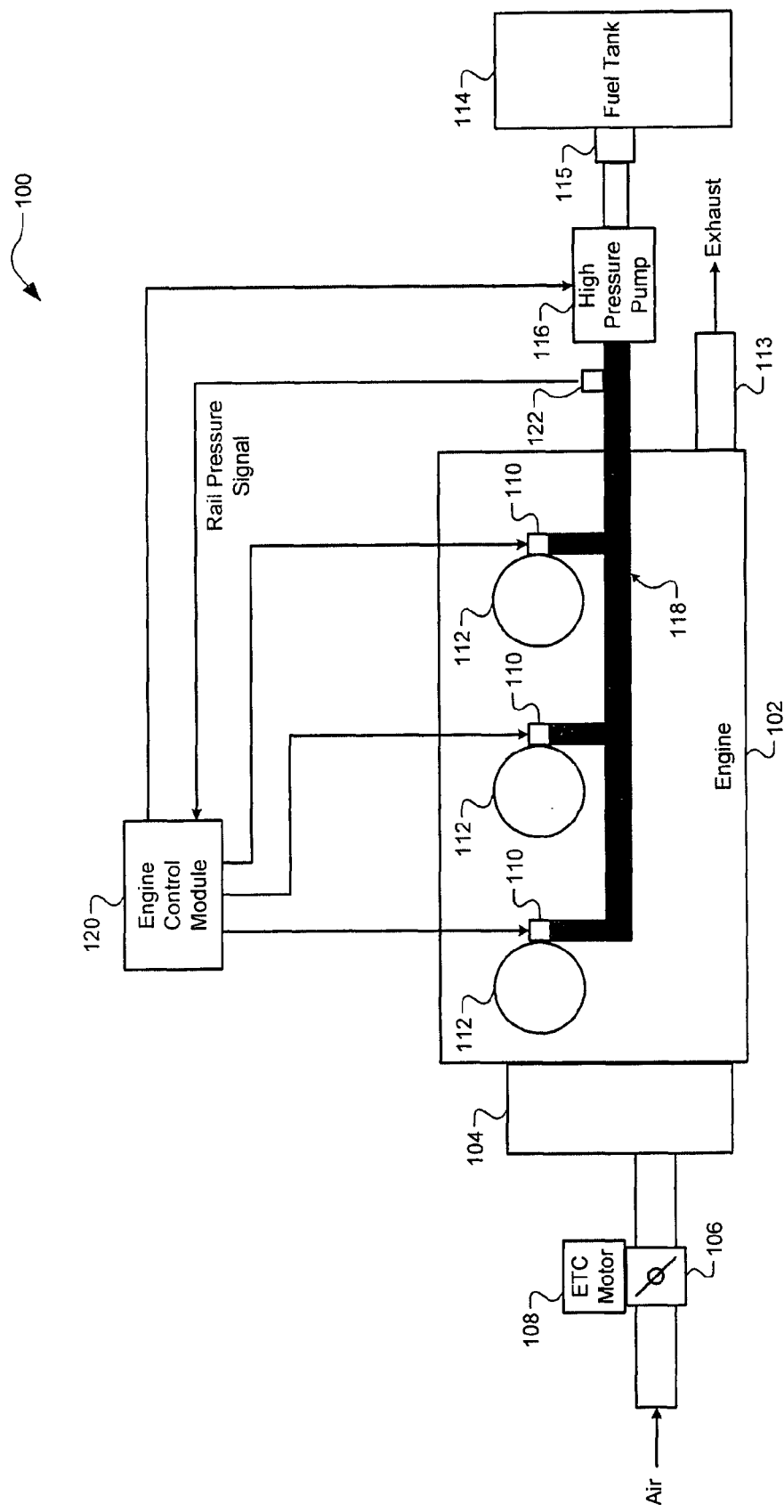
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Faulty fuel injectors may be a common cause of fuel system problems in a vehicle. A service technician who suspects a fuel system problem may attempt to resolve the suspected problem by first replacing the fuel injectors, without knowing whether the fuel injectors are faulty. This may lead to the replacement of functional fuel injectors. If the high pressure side of the fuel system could be tested, a passing test result could eliminate the high pressure side as the source of the problem. As part of the high pressure side, the fuel injectors are likely reliable, and the service technician may then avoid replacing them.

When an engine shuts down, the high pressure pump also shuts down. For example, the high pressure pump may be driven from a crankshaft or camshaft, and therefore slows as the engine comes to a stop. Fuel at high pressure in the fuel rail may then leak back through the inactive pump. In addition, one or more valves may be opened to release the high pressure fuel. A faulty fuel injector may allow fuel to escape, such as into the cylinder, and therefore the rail pressure will decrease at a faster rate than normal. Fault in the high pressure side of the fuel system may be detected based upon the rate at which the rail pressure decreases after engine shutdown. Accordingly, fault in the fuel injectors, as a part of the high pressure side of the fuel system, may be ruled out when fault has not been detected in the high pressure side.

Figure 2:
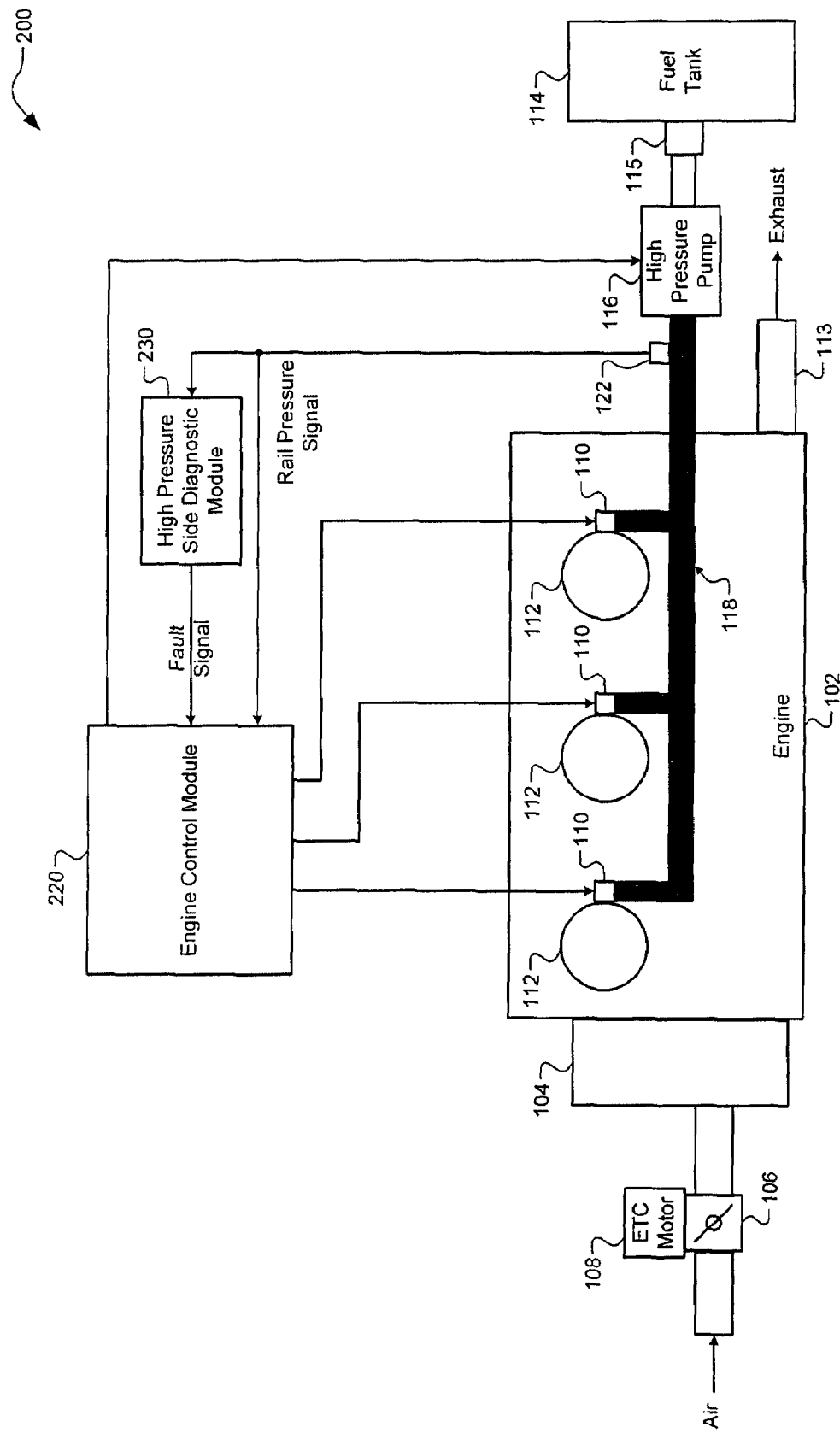
FIG. 2 is a functional block diagram of an exemplary engine system according to the principles of the present disclosure.

Referring now to FIG. 2, a functional block diagram of an exemplary engine system 200 is presented. The engine 102 may be any type of internal combustion engine, such as a spark ignition type engine or a compression ignition type engine. Although three fuel injectors and cylinders are shown, the engine 102 may include more or fewer fuel injectors and cylinders. For example only, one fuel injector 110 may be provided for each cylinder 112.

The fuel system supplies fuel to the engine 102. For example only, the fuel system may include the fuel injectors 110, the fuel tank 114, the low pressure pump 115, the high pressure pump 116, and the fuel rail 118. The high pressure pump 116 provides pressurized fuel to the fuel injectors 110 via the fuel rail 118. The fuel injectors 110, the high pressure pump 116, and the fuel rail 118 are collectively referred to as the high pressure side of the fuel system.

An engine control module (ECM) 220 receives the rail pressure signal from the rail pressure sensor 122. During engine operation, the ECM 220 maintains the rail pressure via the high pressure pump 116. For example only, the ECM 220 may maintain the rail pressure at approximately an operating pressure, such as 35 MPa. Upon engine shutdown, the high pressure pump 116 stops pumping. In various implementations, engine shutdown may correspond to a time when the engine 102 comes to a stop. Alternatively, engine shutdown may correspond to a time when a driver "keys off" the engine.

A high pressure side diagnostic module 230 diagnoses faults in the high pressure side of the fuel system based upon how fast the rail pressure decays after shutdown. The high pressure side diagnostic module 230 may diagnose fault in the high pressure side (e.g., the fuel injectors 110, the high pressure pump 116, and/or the fuel rail 118) when, for example, the rail pressure decays too fast. The fuel rail 118, however, is unlikely to fail, and its failure would likely be detected by other diagnostics. The fuel injectors 110 may be more likely to fail than the high pressure pump 116, and therefore the fuel injectors 110 may be the most likely cause of faults in the high pressure side.

The high pressure side diagnostic module 230 generates a fault signal, which indicates whether fault has been detected in the high pressure side. In various implementations, the high pressure side diagnostic module 230 may detect fault in the high pressure side when a calculated decay rate is greater than a threshold.

In various other implementations, the high pressure side diagnostic module 230 may diagnose fault in the high pressure side of the fuel system without actually calculating the decay rate. For example only, the high pressure side diagnostic module 230 may detect fault in the high pressure side when the rail pressure measured at a predetermined period after engine shutdown is less than a pressure threshold. Alternatively, the high pressure side diagnostic module 230 may detect fault in the high pressure side when the period of time between engine shutdown and a time at which the rail pressure falls below the predetermined pressure is less than a predetermined period.

The ECM 220 receives the fault signal and may signal an error when fault has been detected in the high pressure side. For example only, the ECM 220 may set an error code when fault has been detected. A service technician may then determine whether to replace the fuel injectors 110 based upon whether the error code is set. The ECM 220 may also illuminate a light, such as a "check engine light," when fault has been detected in the high pressure side.

Figure 3:
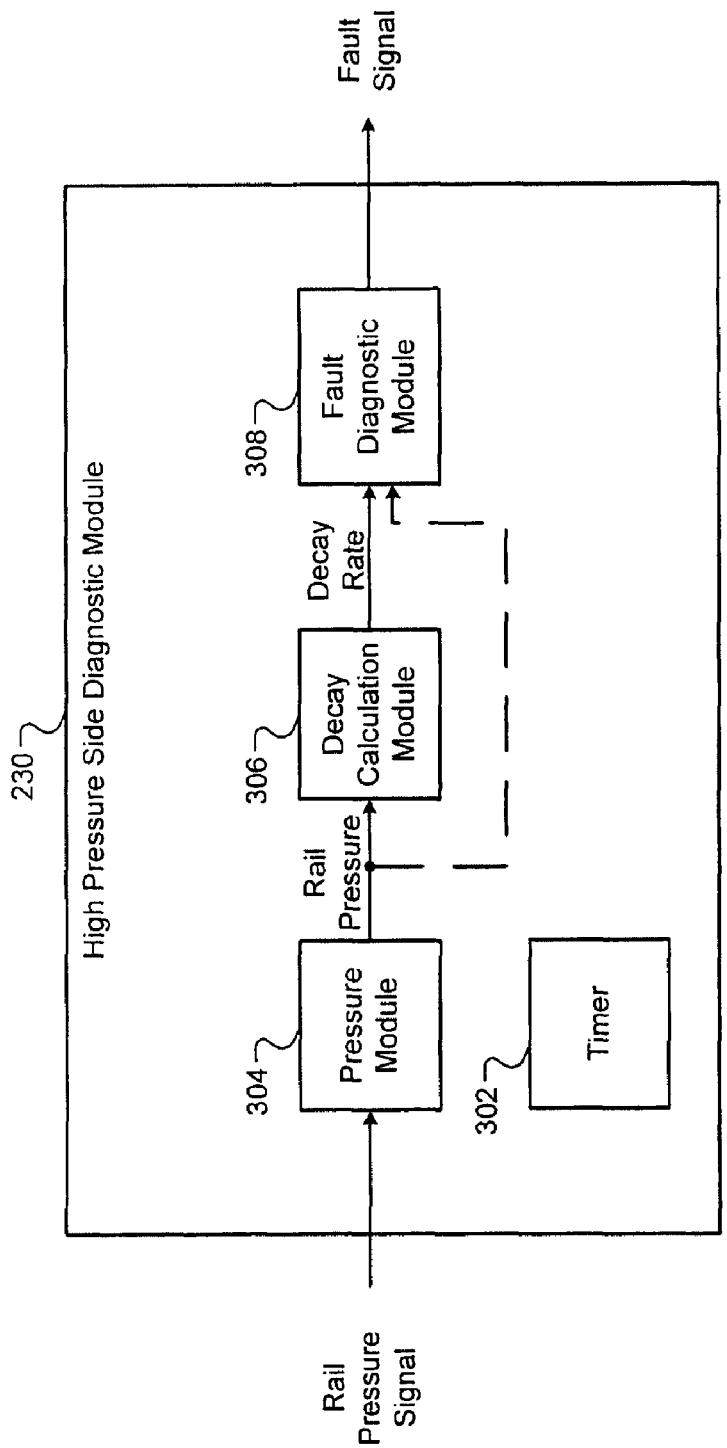
FIG. 3 is a functional block diagram of an exemplary implementation of a high pressure side diagnostic module according to the principles of the present disclosure.

Referring now to FIG. 3, a functional block diagram of an exemplary implementation of the high pressure side diagnostic module 230 is presented. The high pressure side diagnostic module 230 includes a timer 302, a pressure module 304, a decay calculation module 306, and a fault diagnostic module 308. The timer 302 tracks the time elapsed after engine shutdown. In various implementations, the timer 302 may be started from a predetermined reset value, such as zero.

The pressure module 304 receives the rail pressure signal from the rail pressure sensor 122 and may, for example, filter, buffer, and/or digitize the rail pressure signal. For example only, the pressure module 304 may sample the rail pressure signal at a predetermined sampling rate, such as one sample every 0.1 seconds. The pressure module 304 provides a rail pressure to the decay calculation module 306. Additionally, the pressure module 304 may provide the rail pressure to the fault diagnostic module 308.

The decay calculation module 306 calculates the decay rate based upon the rail pressure. In various implementations, the decay rate may be an average rate of change of the rail pressure over a predetermined period, an instantaneous rate of change at a predetermined time or sample, or any other suitable analysis of rail pressure.

For example only, the decay calculation module 306 may calculate the decay rate using the equation:

$$\text{Decay Rate} = \frac{P_1 - P_2}{t}$$

where $P_1$ is a first rail pressure, $P_2$ is a second rail pressure, and t is a period of time between engine shutdown and $P_2$. For example only, the first rail pressure may be measured when the engine 102 is shut down. Alternatively, the decay calculation module 306 may assume that the first rail pressure is the rail pressure maintained by the ECM 220 during normal engine operation.

The decay calculation module 306 may calculate the decay rate by measuring the period of time between engine shutdown and a time at which the rail pressure falls below a predetermined pressure. This measured period and predetermined pressure may be t and $P_2$, respectively, in the above equation. Alternatively, the decay calculation module 306 may calculate the decay rate by measuring the rail pressure after a predetermined period has passed after engine shutdown. This measured pressure and predetermined period may be $P_2$ and t, respectively, in the above equation.

The fault diagnostic module 308 diagnoses faults in the high pressure side of the fuel system and generates the fault signal accordingly. For example only, the fault diagnostic module 308 may detect fault in the high pressure side of the fuel system when the decay rate exceeds a fault threshold. The fault threshold may be calibratable and may be set to a minimum decay rate at which the high pressure side is known to be faulty. For example only, the fault threshold may be set to 8 MPa/s.

Alternatively, the fault diagnostic module 308 may diagnose faults in the high pressure side without actually calculating the decay rate. In various implementations, the fault diagnostic module 308 may detect fault in the high pressure side when the measured rail pressure after a predetermined period is less than a pressure threshold. In various other implementations, the fault diagnostic module 308 may detect fault in the high pressure side when the period of time between engine shutdown and a time at which the rail pressure falls below the predetermined pressure is less than a predetermined period.

Figure 4:
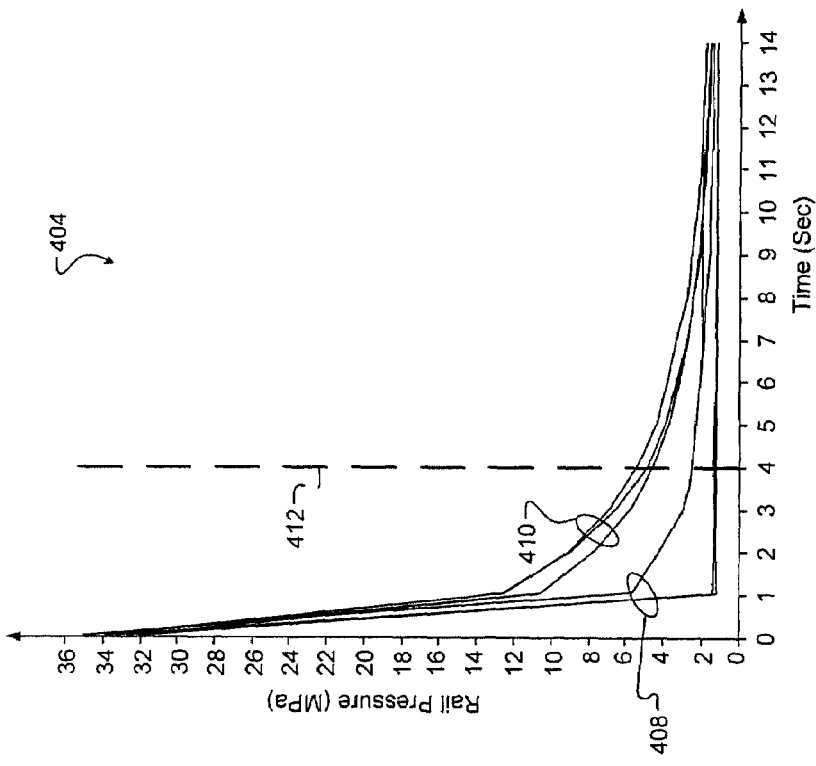
FIG. 4 is an exemplary plot of rail pressure versus time after engine shutdown.
Figure 4:
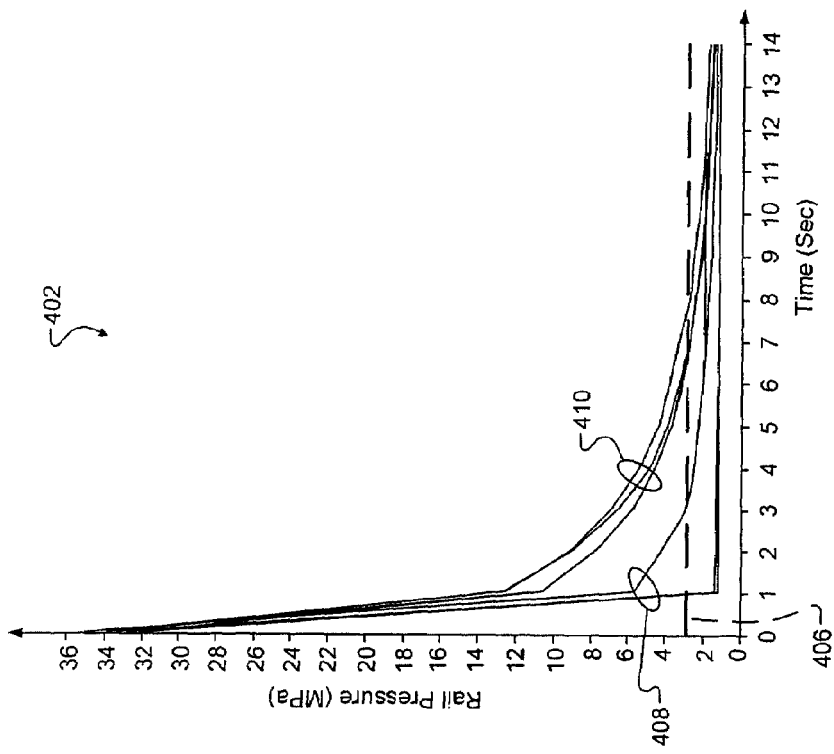

Referring now to FIG. 4, exemplary plots 402 and 404 both depict rail pressure versus time after engine shutdown for the high pressure side of various vehicles. Upon engine shutdown, the rail pressure begins decreasing from an operating pressure, such as 35.0 MPa. The decay rate of rail pressure may be calculated after measuring the period between engine shutdown and a time at which the rail pressure falls below a predetermined pressure (e.g., plot 402) or after measuring the rail pressure at a predetermined period after engine shutdown (e.g., plot 404). The high pressure side of the fuel system may be faulty when the decay rate is greater than the fault threshold, which may be, for example, 8 MPa/s.

Plot 402 depicts measuring the period between engine shutdown and a time at which the rail pressure falls below a predetermined pressure. For example only, the predetermined pressure may be 3.0 MPa, as represented by dashed line 406. The decay rate may then be calculated using, for example, the above equation, and faults in the high pressure side may be detected accordingly.

Alternatively, faults in the high pressure side may be detected by comparing this measured period a predetermined period. For example only, when the fault threshold is 8 MPa/s and the operating pressure ($P_1$) is 35 MPa, the predetermined period may be approximately 4 seconds [i.e., (35 MPa–3 MPa)/8 MPa/s]. Accordingly, the high pressure side may be faulty when the rail pressure falls below 3.0 MPa within 4 seconds after engine shutdown. Using these values, high pressure side diagnostic modules may detect fault in the high pressure side of the fuel systems indicated by reference numeral 408. High pressure side diagnostic modules may determine that the high pressure side of the fuel systems indicated by reference numeral 410 are likely reliable.

Plot 404 depicts measuring the rail pressure after a predetermined period. For example only, the predetermined period may be 4 seconds, as depicted by dashed line 412. The decay rate may then be calculated using, for example, the above equation, and faults may be diagnosed in the high pressure side accordingly.

Alternatively, faults in the high pressure side may be diagnosed based upon a comparison of the measured rail pressure (after the predetermined period) with a pressure threshold. For the case where the fault threshold is 8 MPa/s and the operating pressure is 35 MPa, the pressure threshold may be 3 MPa [i.e., 35 MPa–(8 MPa/s*4 s)]. Accordingly, fault may be detected in the high pressure side when the rail pressure measured 4 seconds after engine shutdown is less than 3 MPa. For example only, fault may be detected in the high pressure side of the fuel systems indicated by reference numeral 408, while it is unlikely that fault will be detected in those indicated by reference numeral 410.

Figure 5:
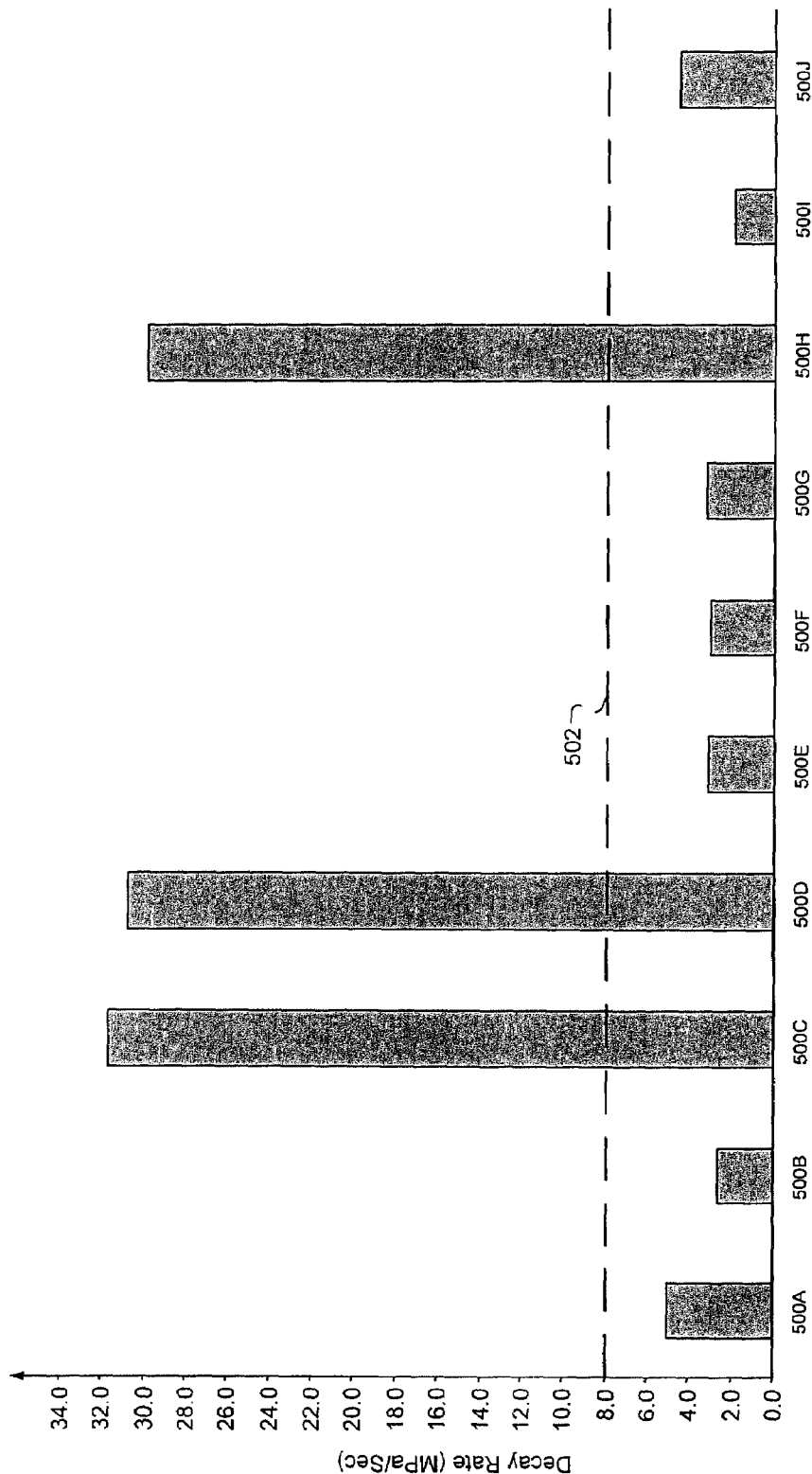
FIG. 5 is an exemplary graph depicting measured decay rates of the high pressure side of various fuel systems according to the principles of the present disclosure.

Referring now to FIG. 5, an exemplary graph depicts measured decay rates of the high pressure side of various fuel systems 500A-500J. Dashed line 502 indicates an exemplary fault threshold, which is 8.0 MPa/s in FIG. 5. Fault may be detected in the high pressure side of each of the fuel systems 500A-500J when its respective decay rate is greater than the fault threshold. As depicted, the high pressure side diagnostic modules corresponding to the fuel systems 500C, 500D, and 500H may detect fault in their respective high pressure sides.

Figure 6A:
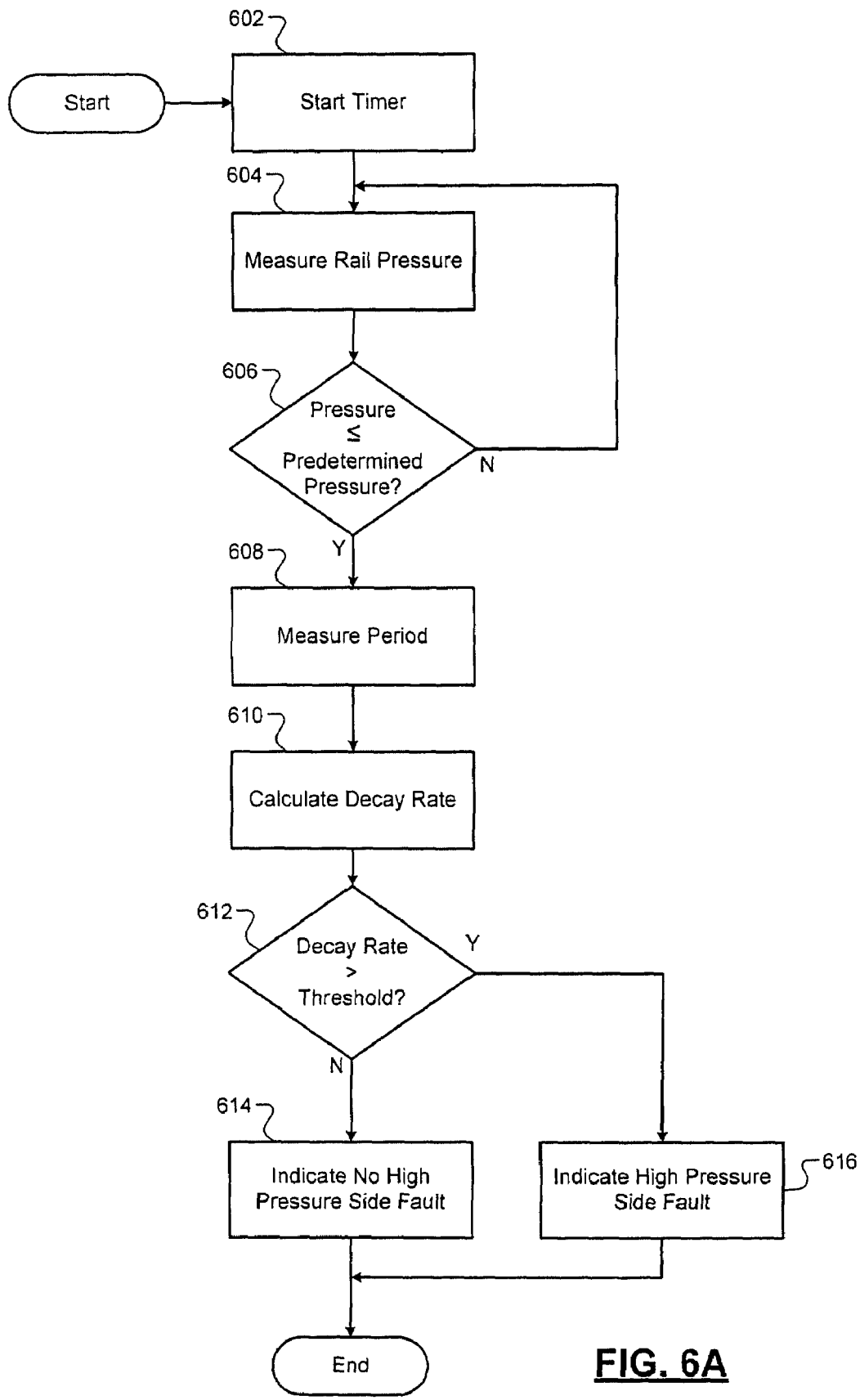
FIGS. 6A-6D are flowcharts depicting exemplary steps performed by high pressure side diagnostic modules according to the principles of the present disclosure.

Referring now to FIG. 6A, a flowchart depicts exemplary steps performed by the high pressure side diagnostic module 230. Control begins in step 602 upon engine shutdown. In step 602, control starts the timer 302. In various implementations, control starts the timer 302 from a reset value, such as zero. Control continues in step 604, where control measures the rail pressure.

In step 606, control determines whether the rail pressure is less than or equal to a predetermined pressure. If so, control continues in step 608; otherwise, control returns to step 604. For example only, the predetermined pressure may be 3.0 MPa. Control continues in step 608, where control measures the period. For example, control may measure the period by reading the timer 302, and calculating the difference between the reset value and the timer value.

In step 610, control calculates the decay rate, for example, using the equation:

$$\text{Decay Rate} = \frac{P_1 - P_2}{t}$$

where $P_1$ is the first rail pressure, $P_2$ is a second rail pressure, and t is the period. For example only, the predetermined pressure and the period may be used as $P_2$ and t, respectively. The first pressure measured in step 604 may be used as $P_1$. Alternatively, control may assume that $P_1$ is the operating pressure maintained by the ECM 220.

Control then determines whether the decay rate is greater than the fault threshold in step 612. If so, control continues in step 614; otherwise, control transfers to step 616. In step 614, control indicates that no fault has been detected in the high pressure side of the fuel system, and control ends. In step 616, control indicates fault in the high pressure side of the fuel system, and control ends. Control may indicate fault in the high pressure side of the fuel system by, for example, setting the error code and/or illuminating the "check engine light."

Figure 6B:
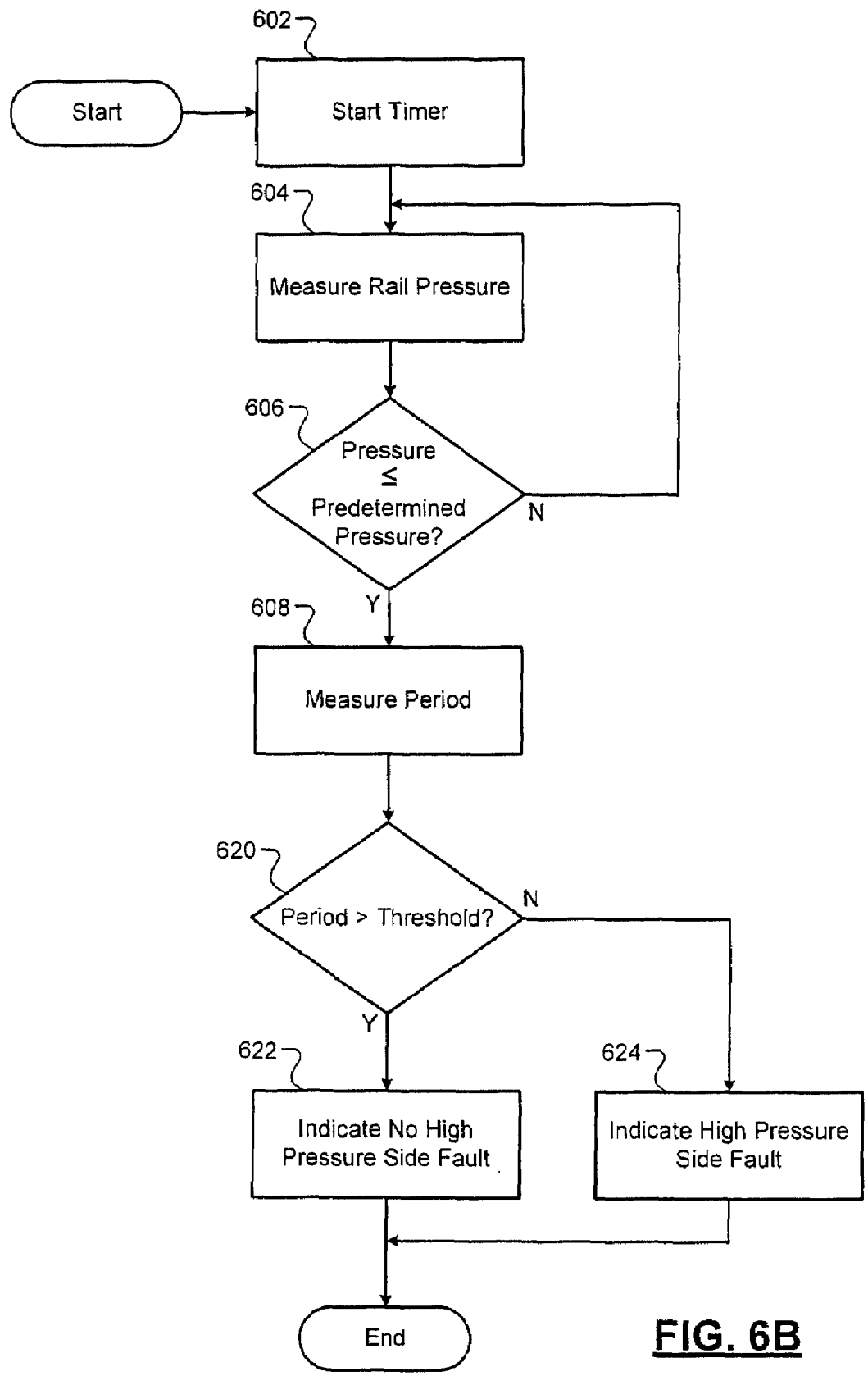

Referring now to FIG. 6B, a second flowchart depicting exemplary steps performed the high pressure side diagnostic module 230 is presented. Control performs steps 602 to 608 as in FIG. 6A above. Instead of calculating the decay rate, control then continues in step 620 where control determines whether the period is greater than a threshold (i.e., a predetermined period). If so, control continues in step 622; otherwise, control transfers to step 624. In step 622, control that no fault has been detected in the high pressure and control ends. In step 624, control indicates fault in the high pressure side and control ends.

Figure 6C:
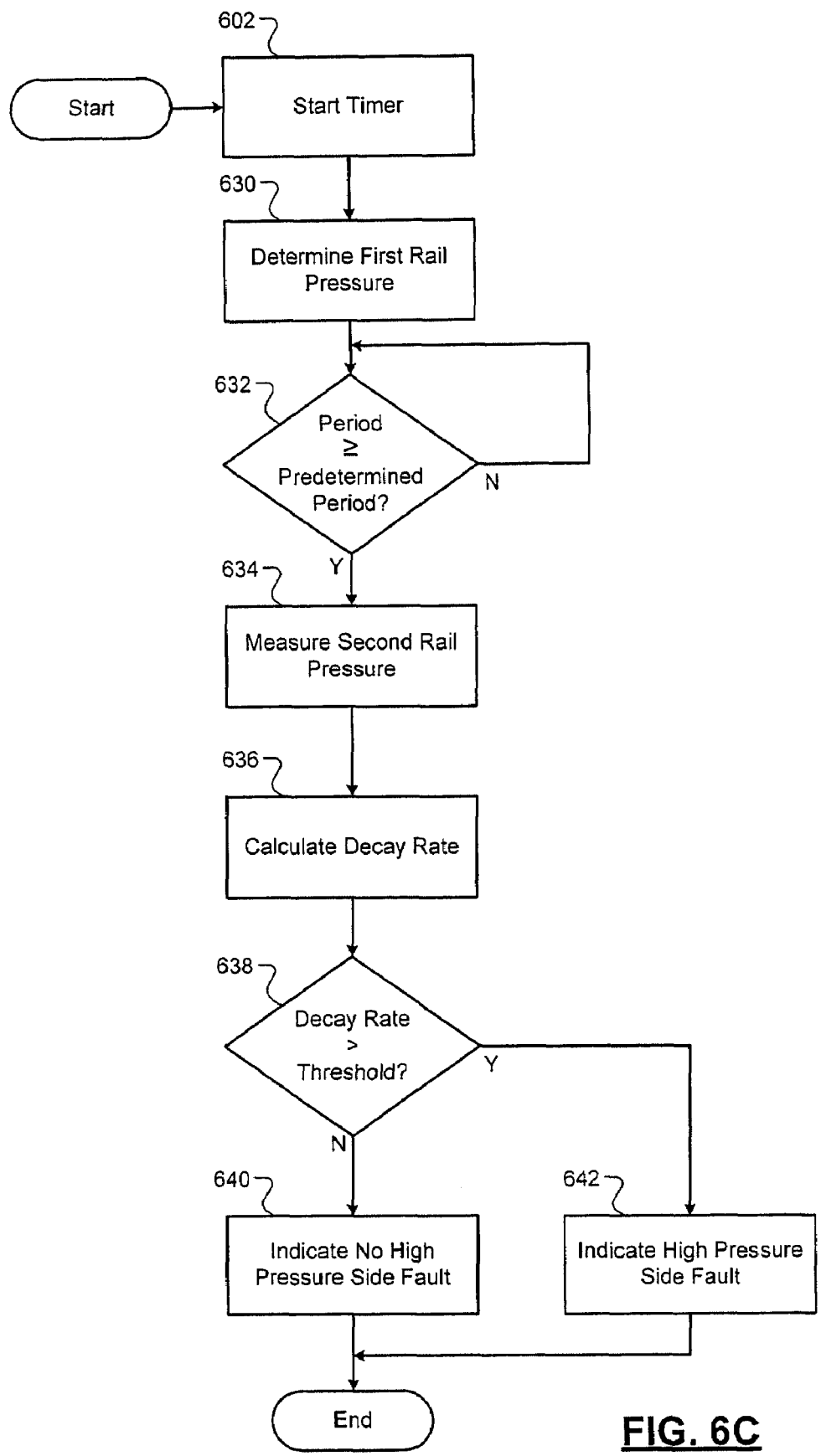

Referring now to FIG. 6C, a third flowchart depicts exemplary steps performed by the high pressure side diagnostic module 230. Control starts the timer 302 in step 602. In step 630, control determines a first rail pressure. Control may measure the first rail pressure upon engine shutdown or assume that the first rail pressure is the rail pressure maintained by the ECM 220 during normal engine operation. In step 632, control determines whether the period since engine shutdown (i.e., starting the timer) is greater than or equal to a predetermined period. If so, control continues in step 634; otherwise, control remains in step 632.

In step 634, control measures a second rail pressure. Control then continues in step 636, where control calculates the decay rate based upon the first rail pressure, the second rail pressure, and the predetermined period. In step 638, control determines whether the decay rate is greater than the fault threshold. If so, control continues in step 640; otherwise, control transfers to step 642. In step 640, control indicates that fault has not been detected in the high pressure side of the fuel system, and control ends. In step 642, control indicates fault in the high pressure side of the fuel system, and control ends.

Figure 6D:
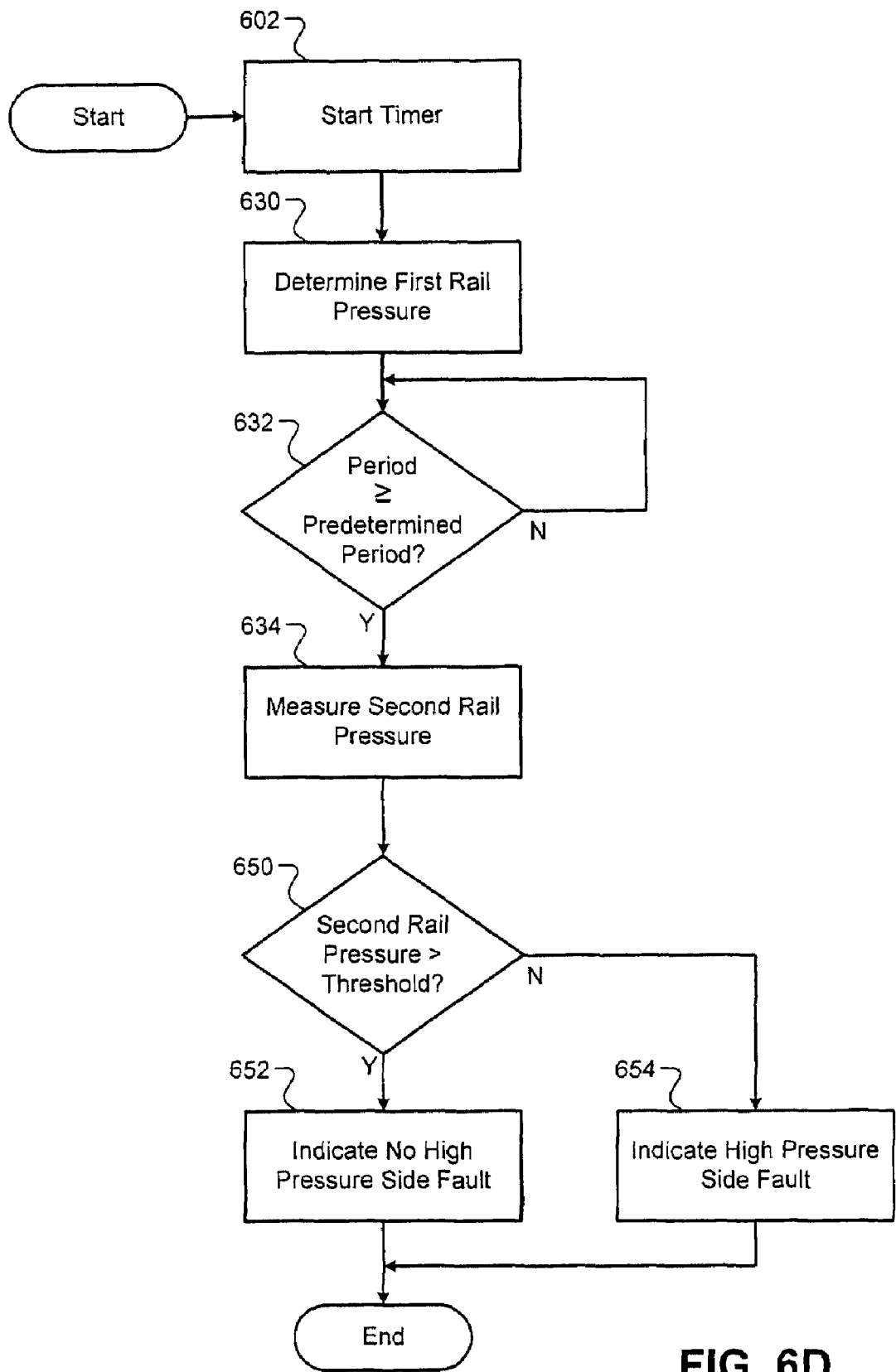

Referring now to FIG. 6D, a fourth flowchart depicting exemplary steps performed by the high pressure side diagnostic module 230 is presented. Control performs steps 602 and 630-34 as in FIG. 6C. Instead of calculating the decay rate, control then continues in step 650 where control determines whether the second rail pressure is greater than a pressure threshold. If so, control continues in step 652; otherwise, control transfers to step 654. In step 652, control indicates that no fault has been detected in the high pressure side and control ends. In step 654, control indicates fault in the high pressure side and control ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A fuel system diagnostic module comprising:
   a pressure module that monitors a rail pressure in a fuel rail of a fuel system of an engine;
   a timer module that determines a period between shutdown of the engine and a time after the engine shutdown when the rail pressure transitions from a first rail pressure that is greater than a predetermined rail pressure to a second rail pressure that is less than the predetermined rail pressure; and
   a fault diagnostic module that selectively diagnoses a fault in the fuel system based upon a comparison of the period and a predetermined period.

2. The fuel system diagnostic module of claim 1 further comprising a decay calculation module that determines a decay rate based upon the second rail pressure, a third rail pressure before the second rail pressure, and the period,
   wherein the fault diagnostic module diagnoses the fault when the decay rate is greater than a predetermined value.

3. The fuel system diagnostic module of claim 2 wherein the third rail pressure is measured at the engine shutdown.

4. The fuel system diagnostic module of claim 2 wherein the third rail pressure is measured before the engine shutdown.

5. The fuel system diagnostic module of claim 1 wherein the fault diagnostic module diagnoses the fault when the period is less than the predetermined period.

6. The fuel system diagnostic module of claim 1 wherein the fuel system comprises the fuel rail, a fuel injector, and a fuel pump.

7. A method comprising:
   monitoring a rail pressure in a fuel rail of a fuel system of an engine;
   determining a period between shutdown of the engine and a time after the engine shutdown when the rail pressure transitions from a first rail pressure that is greater than a predetermined rail pressure to a second rail pressure that is less than the predetermined rail pressure; and
   selectively diagnosing a fault in the fuel system based upon a comparison of the period and a predetermined period.

8. The method of claim 7 further comprising:
   determining a decay rate based upon the second rail pressure, a third rail pressure measured before the second rail pressure, and the period; and
   diagnosing the fault when the decay rate is greater than a predetermined value.

9. The method of claim 8 further comprising measuring the third rail pressure before the engine shutdown.

10. The method of claim 8 further comprising measuring the third rail pressure at the engine shutdown.

11. The method of claim 7 further comprising diagnosing the fault when the period is less than the predetermined period.

12. The method of claim 7 wherein the fuel system comprises the fuel rail, a fuel injector, and a fuel pump.

13. A method comprising:
monitoring a rail pressure in a fuel rail that receives fuel from an engine driven fuel pump and that provides the fuel to one or more fuel injectors of an engine;
determining a period between shutdown of the engine and a time after the engine shutdown when the rail pressure transitions from a first rail pressure that is greater than a predetermined rail pressure to a second rail pressure that is less than the predetermined rail pressure; and
selectively indicating that the one or more fuel injectors are reliable based on a comparison of the period and a predetermined period.

14. The method of claim 13 further comprising selectively indicating that the one or more fuel injectors are reliable when the period is greater than the predetermined period.

15. The method of claim 13 further comprising:
determining a decay rate of the rail pressure based on the second rail pressure, the period, and a third rail pressure that is measured one of before and at the engine shutdown; and
indicating that the one or more fuel injectors are reliable when the decay rate is less than a predetermined value.

16. The method of claim 13 wherein the engine driven fuel pump receives the fuel from a low pressure fuel pump at a first predetermined pressure and pressurizes the fuel within the fuel rail based on a second predetermined pressure,
wherein the second predetermined pressure is greater than the first predetermined pressure.

* * * * *